(12) United States Patent
Fujita et al.

(10) Patent No.: US 12,715,397 B2
(45) Date of Patent: Aug. 25, 2026

(54) VIBRATOR-ATTACHED VEHICULAR WINDOW GLASS AND VIBRATOR-ATTACHED VEHICULAR WINDOW GLASS SYSTEM

(71) Applicant: AGC Inc., Tokyo (JP)

(72) Inventors: Ken Fujita, Tokyo (JP); Jun Akiyama, Tokyo (JP)

(73) Assignee: AGC INC., Tokyo (JP)

( * ) Notice: Subject to any disclaimer, the term of this patent is extended or adjusted under 35 U.S.C. 154(b) by 75 days.

(21) Appl. No.: 18/663,711

(22) Filed: May 14, 2024

(65) Prior Publication Data

US 2024/0300452 A1 Sep. 12, 2024

Related U.S. Application Data

(63) Continuation of application No. PCT/JP2022/041980, filed on Nov. 10, 2022.

(30) Foreign Application Priority Data

Nov. 15, 2021 (JP) ................................ 2021-185838

(51) Int. Cl.
*B60S 1/58* (2006.01)
*B08B 7/02* (2006.01)

(52) U.S. Cl.
CPC . *B60S 1/58* (2013.01); *B08B 7/02* (2013.01)

(58) Field of Classification Search
None
See application file for complete search history.

(56) References Cited

U.S. PATENT DOCUMENTS

2015/0298656 A1* 10/2015 Pascoe ...................... B60S 1/02 381/86
2018/0250722 A1* 9/2018 Trevett .................... B08B 7/028

FOREIGN PATENT DOCUMENTS

JP H08-183428 A 7/1996
JP H08-268232 A 10/1996
JP H08-295204 A 11/1996
JP 2003-285689 A 10/2003
JP 2014-074118 A 4/2014
JP 2014-133426 A 7/2014

OTHER PUBLICATIONS

CN 108082127 A machine translation, a Rain-wiping System of Automobile Without Scraping Sheet, Wu (Year: 2018).*
JP 2020157892 A machine translation, Deposit Removal Device, Ueda (Year: 2020).*
International Searching Authority, "International Search Report," issued in connection with International Patent Application No. PCT/JP2022/041980, dated Jan. 24, 2023.
International Searching Authority, "Written Opinion," issued in connection with International Patent Application No. PCT/JP2022/041980, dated Jan. 24, 2023.

* cited by examiner

*Primary Examiner* — Cristi J Tate-Sims
(74) *Attorney, Agent, or Firm* — Foley & Lardner LLP

(57) ABSTRACT

A vibrator-attached vehicular window glass includes: a vehicular window glass including a first glass plate including a first main surface with a water repellent coating; and a first vibrator configured to apply a vibration to the first glass plate, in which the first vibrator is configured to vibrate at an excitation frequency of 10 Hz to 100,000 Hz.

18 Claims, 9 Drawing Sheets

VIBRATOR-ATTACHED VEHICULAR WINDOW GLASS AND VIBRATOR-ATTACHED VEHICULAR WINDOW GLASS SYSTEM

CROSS-REFERENCE TO RELATED APPLICATIONS

This is a bypass continuation of International Patent Application No. PCT/JP2022/041980, filed on Nov. 10, 2022, which claims priority to Japanese Patent Application No. 2021-185838, filed on Nov. 15, 2021. The contents of these applications are hereby incorporated by reference in their entireties.

TECHNICAL FIELD

The present invention relates to a vibrator-attached vehicular window glass and a vibrator-attached vehicular window glass system.

BACKGROUND ART

A vehicular window glass of an automobile or the like is devised to attach a wiper to remove water droplets to ensure a field of view during rainy weather or the like, or to apply a water repellent coating to a surface of a glass plate to allow water droplets to fall.

In order to more effectively remove rainwater with a wiper and a water repellent coating, Patent Literature 1 discloses a water droplet removal device for vehicle in which a vibrator for applying a vibration that cannot be visually recognized by a human eye to a vehicular window glass is attached using a high-frequency power source, thereby further promoting the fall of rainwater.

CITATION LIST

Patent Literature

Patent Literature 1: JPH08-268232A

SUMMARY OF INVENTION

However, the high-frequency vibration is not necessarily efficient in making water droplets fall, and in particular, is not sufficient to efficiently remove water droplets adhering to a vehicular window glass coated with a water repellent coating.

Therefore, an object of the present invention is to provide a vibrator-attached vehicular window glass and a vibrator-attached vehicular window glass system including the vibrator-attached vehicular window glass that increase water falling efficiency by a vibration applied from a vibrator attached to a vehicular window glass coated with a water repellent coating.

The present invention has the following configurations.

(1) A vibrator-attached vehicular window glass, including:

a vehicular window glass including a first glass plate having a first main surface with a water repellent coating; and a first vibrator configured to apply a vibration to the first glass plate, in which the first vibrator is configured to vibrate at an excitation frequency of 10 Hz to 100,000 Hz.

(2) A vibrator-attached vehicular window glass system, including:

the vibrator-attached vehicular window glass according to the above (1); and a second vibrator different from the first vibrator, in which a sound pressure generated from a diaphragm provided with the second vibrator is controlled to cancel a sound pressure generated from the first glass plate provided with the first vibrator.

According to the present invention, water falling efficiency is increased by a vibration applied from a vibrator attached to a vehicular window glass coated with a water repellent coating.

BRIEF DESCRIPTION OF DRAWINGS

FIG. 7 is a schematic block diagram showing a modification of the vibrator-attached vehicular window glass system.

FIG. 9 is a schematic block diagram of a vibrator-attached vehicular window glass system that includes audio speakers as the second vibrator.

DESCRIPTION OF EMBODIMENTS

Hereinafter, an embodiment of the present invention will be described in detail with reference to the drawings.

Vibrator-Attached Vehicular Window Glass

Figure 1:
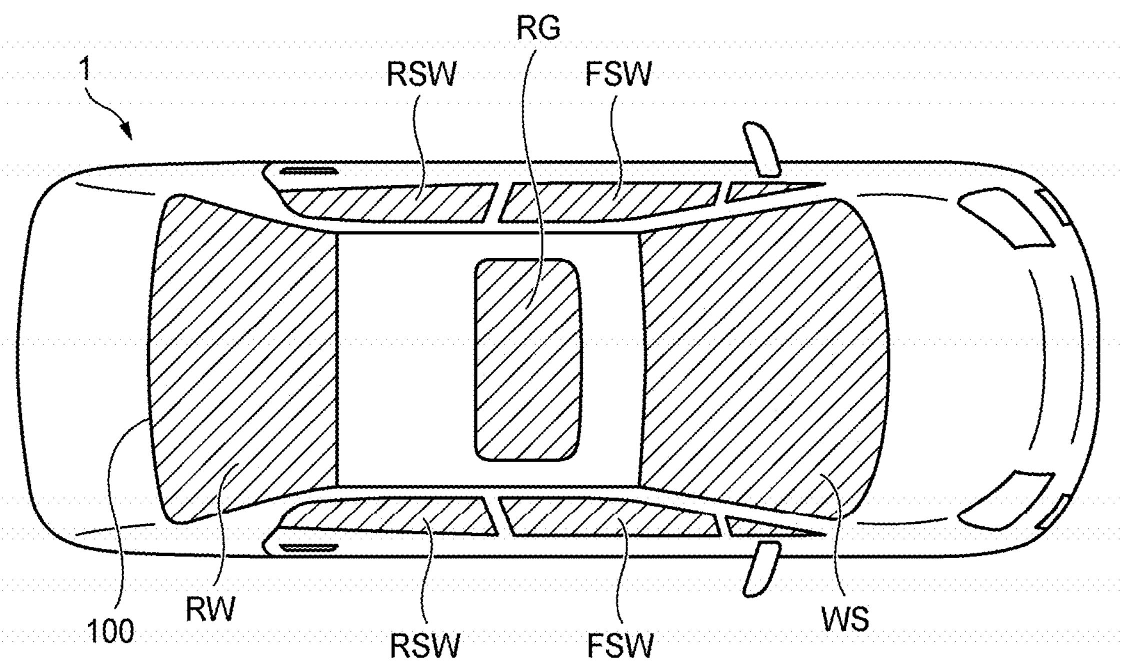
FIG. 1 is a plan view of a vehicle including a vibrator-attached vehicular window glass.

FIG. 1 is a plan view of a vehicle 1 including a vibrator-attached vehicular window glass 100.

As shown in FIG. 1, the vibrator-attached vehicular window glass 100 according to the present embodiment is used as a glass of a rear window RW, a windshield WS, a roof glazing RG, front side windows FSW, rear side windows RSW, or the like of the vehicle 1. In this example, a case is shown in which the vibrator-attached vehicular window glass 100 is attached as the rear window RW of the vehicle 1.

Figure 2:
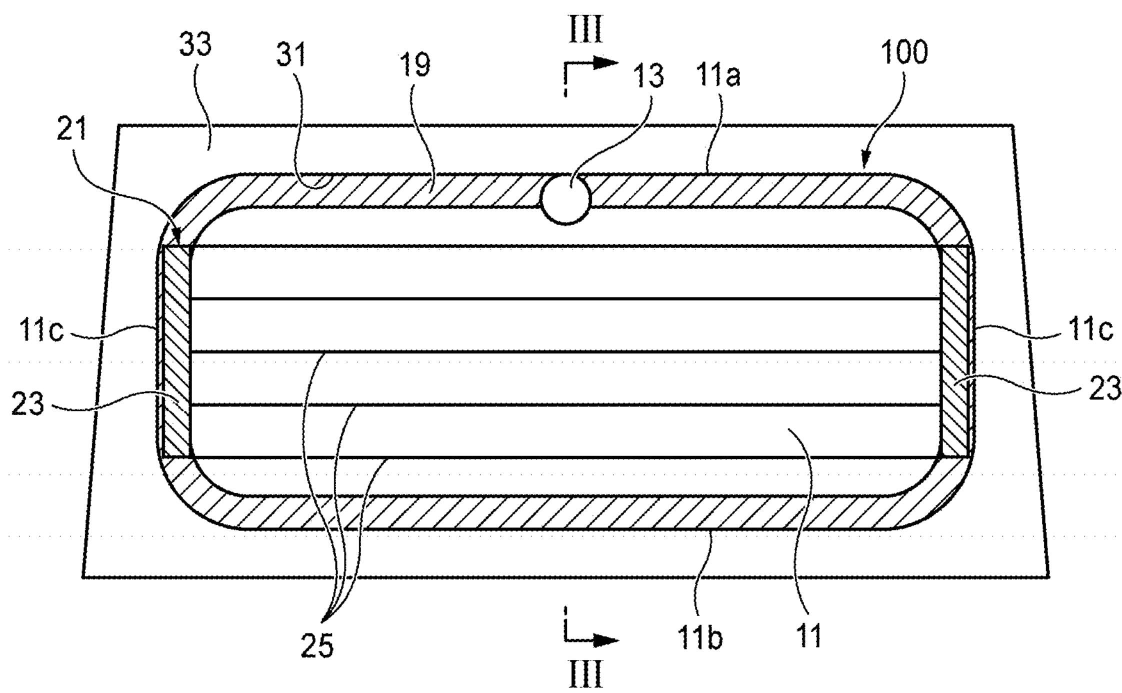
FIG. 2 is a plan view of the vibrator-attached vehicular window glass as viewed from an interior side of the vehicle.
Figure 3:
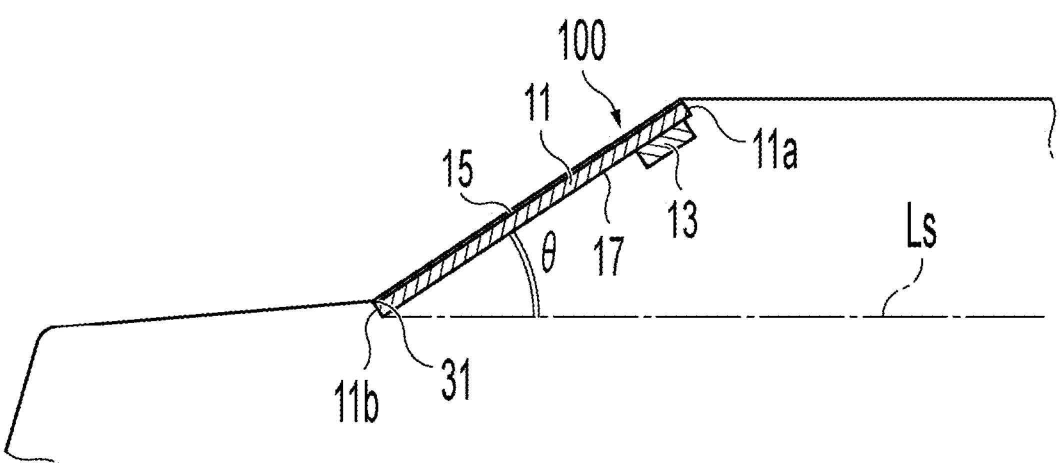
FIG. 3 is a schematic cross-sectional view taken along the line III-III in FIG. 2.

FIG. 2 is a plan view of the vibrator-attached vehicular window glass 100 as viewed from an interior side of the vehicle 1, and is particularly a plan view including a rear glass (rear window RW). FIG. 3 is a schematic cross-sectional view taken along the line III-III in FIG. 2.

As shown in FIGS. 2 and 3, the vibrator-attached vehicular window glass 100 includes a first glass plate 11 and a first vibrator 13. The first glass plate 11 may be a laminated glass in which an intermediate layer is sandwiched between a pair of glass plates, or may be a single plate glass made of one glass plate. The first glass plate 11 has a substantially rectangular shape in a plan view having an upper side 11*a*, a lower side 11*b*, and left and right sides 11*c*. The substantially rectangular shape is not limited to a square or a rectangle as long as the shape has four sides, and may be a trapezoid or a parallelogram, and also includes a case where at least one side has a gently curved shape. The first glass plate 11 may have a planar shape or a curved shape. For example, the first glass plate 11 may have a single curved shape curved in either a vertical direction or a horizontal direction when the first glass plate 11 is attached to the vehicle 1, and may have a multi-curved shape curved in both the vertical direction and the horizontal direction.

The first glass plate 11 is fitted into a window frame 33 having an opening 31 in a rear portion of the vehicle 1. Accordingly, the rear window RW of the vehicle 1 is implemented by the first glass plate 11. In the first glass plate 11 fitted into the window frame 33, a first main surface 15 which is one main surface is disposed on an outer side of the vehicle 1, and a second main surface 17 which is the other main surface is disposed on a vehicle inner side.

The first glass plate 11 has a light shielding film 19 on the second main surface 17. The light shielding film 19 is formed at an outer edge portion along an inner edge portion of the opening 31 of the window frame 33. Specific examples of the light shielding film 19 include ceramics such as a black ceramic film having a thickness of about several micrometers to several tens of micrometers. By the light shielding film 19, an adhesive such as a urethane resin for fixing the first glass plate 11 to the window frame 33 is protected from ultraviolet rays, and an adhesive portion is hidden to secure a good appearance.

The first glass plate 11 includes a defogger 21 on the second main surface 17. The defogger 21 includes a pair of bus bars 23 and a plurality of heating wires 25. The bus bars 23 are provided along the left and right sides 11*c* when the first glass plate 11 is attached to the window frame 33, and are arranged at positions overlapping the light shielding film 19. At this time, the heating wires 25 are each provided along the horizontal direction of the first glass plate 11, and are arranged at intervals in the vertical direction. Both ends of the heating wire 25 are connected to the bus bars 23, and the defogger 21 applies a DC voltage to the pair of bus bars 23 to cause a current to flow through the heating wire 25 to generate heat, thereby eliminating dew condensation and freezing on the first glass plate 11.

Figure 4:
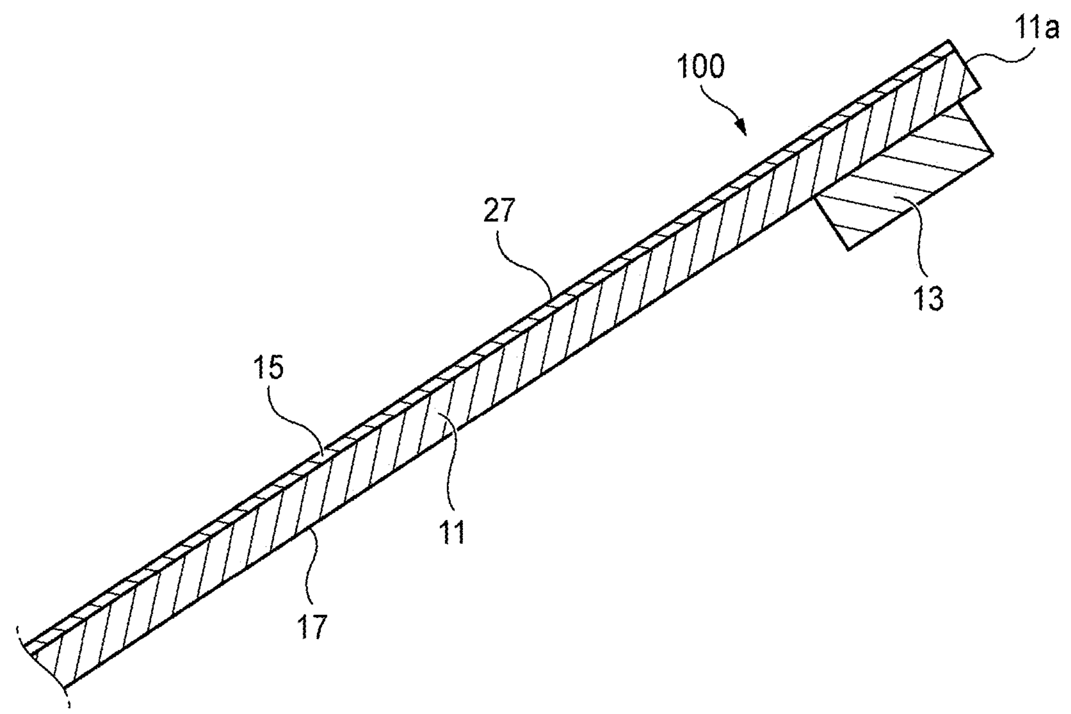
FIG. 4 is an enlarged view of a part of the vibrator-attached vehicular window glass in FIG. 3.

FIG. 4 is an enlarged view of a part of the vibrator-attached vehicular window glass 100 in FIG. 3. Although the light shielding film 19 is omitted in FIGS. 3 and 4, the light shielding film 19 (not shown) may be provided on the second main surface 17, and the first vibrator 13 may be attached via an adhesive or the like so as to be in contact with the light shielding film 19. Further, the first vibrator 13 may be attached to the first main surface 15 as long as the first vibrator 13 has a waterproof function.

As shown in FIG. 4, the first glass plate 11 has a water repellent coating 27 on the first main surface 15. Accordingly, the first main surface 15 of the first glass plate 11 has an improved water sliding property by the water repellent coating 27. As the water repellent coating 27, a water repellent film disclosed in JP2014-74118A is preferred.

This water repellent film includes a base layer and a water repellent layer in this order on or above the first main surface 15 of the first glass plate 11. The base layer is formed using a base layer forming composition containing bissilane having a hydrolyzable silyl group or a silanol group, and/or a partially hydrolyzed condensate thereof. In addition, the water repellent layer is formed using a water repellent layer forming composition containing a linear polyorganosiloxane having a hydrolyzable silyl group, and/or a partially hydrolyzed condensate thereof. In the first glass plate 11 having, on the first main surface 15, the water repellent coating 27 formed by the water repellent film, a water sliding property is set to be, for example, a water sliding angle of 5° at 50 μL. That is, by the water repellent coating 27 applied to the first main surface 15 of the first glass plate 11, the first main surface 15 of the first glass plate 11 has a water sliding property such that when the first main surface 15 is tilted at an inclination angle of 5°, 50 μL of water droplets attached thereto fall. The water sliding property is determined by dropping 50 μL of water droplets onto the first main surface 15 of the first glass plate 11 having the water repellent coating 27, then gradually tilting the first glass plate 11, and measuring an inclination angle of the first glass plate 11 with respect to a horizontal surface when the water droplets start to fall. Then, this measurement is performed, for example, at five different locations of the first main surface 15, and an average value is calculated to obtain the water sliding property.

The first vibrator 13 is attached to the second main surface 17 opposite to the first main surface 15 of the first glass plate 11. The first vibrator 13 is a vibrator that vibrates at an excitation frequency of 10 Hz to 100,000 Hz. As the first vibrator 13, a known exciter that applies a vibration to the first glass plate 11 can be used. The first vibrator 13 promotes the falling of water droplets adhering to the first main surface 15 by applying a vibration to the first glass plate 11. An excitation frequency of the first vibrator 13 is preferably 10 Hz to 20,000 Hz, more preferably 10 Hz to 10,000 Hz, still more preferably 10 Hz to 1,000 Hz, even more preferably 20 Hz to 1,000 Hz, yet more preferably 30 Hz to 1,000 Hz, further more preferably 30 Hz to 200 Hz, and particularly preferably 30 Hz to 100 Hz.

The first vibrator 13 may be fixed to the second main surface 17 of the first glass plate 11 via an adhesive, a sticking agent, or the like, or may be fixed by fastening to, using a bolt, a screw, or the like, a mounting member fixed to the second main surface 17 of the first glass plate 11. The first vibrator 13 may be coupled to the second main surface 17 of the first glass plate 11 via a transmission member that transmits the vibration, and the vibration of the first vibrator 13 may be applied to the first glass plate 11 via the transmission member.

The number of first vibrators 13 attached to the first glass plate 11 may be basically one, but may be two or more. That is, in the present specification, the first vibrator 13 implies that it includes not only a single one but also multiple ones. Even if the number of first vibrators 13 attached to the first glass plate 11 is two or more, the first vibrators 13 may be arranged in the vicinity of the upper side 11*a* of the first glass plate 11 as to be described later. For example, in a case where the number of first vibrators 13 attached to the first glass plate 11 is two, the first vibrators 13 may be attached in the vicinity of the upper side 11*a* of the first glass plate 11 and at positions at substantially equal distances to the left and right with reference to a middle point in a width direction (horizontal direction when attached to the window frame 33). In a case where the number of first vibrators 13 attached to the first glass plate 11 is two or more, excitation frequencies of the vibrators may be the same or different as long as the excitation frequencies are within the above range. Hereinafter, the number of first vibrators 13 attached to the first glass plate 11 will be described as one unless otherwise specified.

When the vibrator-attached vehicular window glass 100 is attached to the vehicle 1, the first vibrator 13 is attached in the vicinity of the upper side 11*a* of the first glass plate 11, and is disposed at a position overlapping the light shielding film 19. The first vibrator 13 is attached in the vicinity of the upper side 11*a* of the first glass plate 11 and in the vicinity of a center portion of the first glass plate 11 in the width direction.

When the first vibrator 13 is attached in the vicinity of the upper side 11*a* of the first glass plate 11, the water droplets adhering to the first main surface 15 of the first glass plate 11 fall efficiently by the vibration applied from the first vibrator 13. Further, when the first vibrator 13 is attached in the vicinity of the upper side 11*a* of the first glass plate 11 and in the vicinity of a center portion of the first glass plate 11 in the width direction, the water droplets adhering to the first main surface 15 of the first glass plate 11 fall in a well-balanced manner over the entire width direction by the vibration applied from the first vibrator 13. When the first vibrator 13 is disposed at a position overlapping at least a part of the light shielding film 19, the first vibrator 13 can be made inconspicuous, and it is more preferable that the first vibrator 13 be disposed in a manner of overlapping the entire light shielding film. A cover may be provided on an edge portion of the opening 31 of the window frame 33 to cover the first vibrator 13.

The vicinity of the upper side 11*a* of the first glass plate 11 means, for example, a region within 20% of a width (in an up-down direction) from the upper side 11*a* toward the lower side 11*b* when attached to the window frame 33. The vicinity of the center portion of the first glass plate 11 in the width direction means, for example, a region within 20% on each of left and right sides with respect to a middle point of the first glass plate 11 in the width direction when attached to the window frame 33. For example, in the vicinity of the rear window RW, when an electric device such as a high-mounted stop lamp is disposed in the vicinity of the upper side 11*a* of the first glass plate 11 and in the vicinity of the center portion of the first glass plate 11 in the width direction, the first vibrator 13 may be disposed at a position shifted from the middle point of the first glass plate 11 in the width direction.

When the vibrator-attached vehicular window glass 100 is attached to the vehicle 1, an inclination angle θ of the first glass plate 11 with respect to a horizontal surface Ls is 5° to 175°. When the inclination angle θ is within the above range, a water falling effect can be obtained by gravity with respect to the water droplets adhering to the first main surface 15 of the first glass plate 11. The inclination angle θ may be 5° to 90°, 30° to 90°, 60° to 90°, or 90° to 175°.

In the vibrator-attached vehicular window glass 100 having the above configuration, the first vibrator 13 vibrates at an excitation frequency of 10 Hz to 100,000 Hz. Accordingly, the vibration is applied to the first glass plate 11 from the first vibrator 13. Thus, in the first main surface 15 having the water repellent coating 27, the adhered water droplets combine with each other by the vibration, thereby increasing a volume and easily falling. The excitation frequency to the first glass plate 11 by the first vibrator 13 may be constant, but may be changed depending on, for example, rain conditions or a size of the water droplets adhering to the first main surface 15.

The first vibrator 13 may be attached to the front side window FSW that slides up and down. In this case, the first vibrator 13 may be attached below a belt line (not shown) of the front side window FSW so as not to be visually recognized by an occupant. Further, the front side window FSW to which the first vibrator 13 is attached may be excited such that, for example, an occupant in a driver seat or a passenger seat can check a door mirror while sitting. At this time, the entire region of the front side window FSW may be excited at the same level to make a water sliding effect uniform, but an attaching position of the first vibrator 13 may be adjusted so as to have an intensity distribution that excites a region in front more strongly so that the occupant can check the door mirror.

As described above, according to the vibrator-attached vehicular window glass plate 100 of the present embodiment, the vibration is applied to the first glass plate 11 at the excitation frequency of 10 Hz to 100,000 Hz by the first vibrator 13, and thus water falling efficiency of the first main surface 15 of the first glass plate 11 having the water repellent coating 27 can be increased. Accordingly, it is possible to ensure a good field of view during traveling in a rainy weather or the like.

Vibrator-Attached Vehicular Window Glass System

Figure 5:
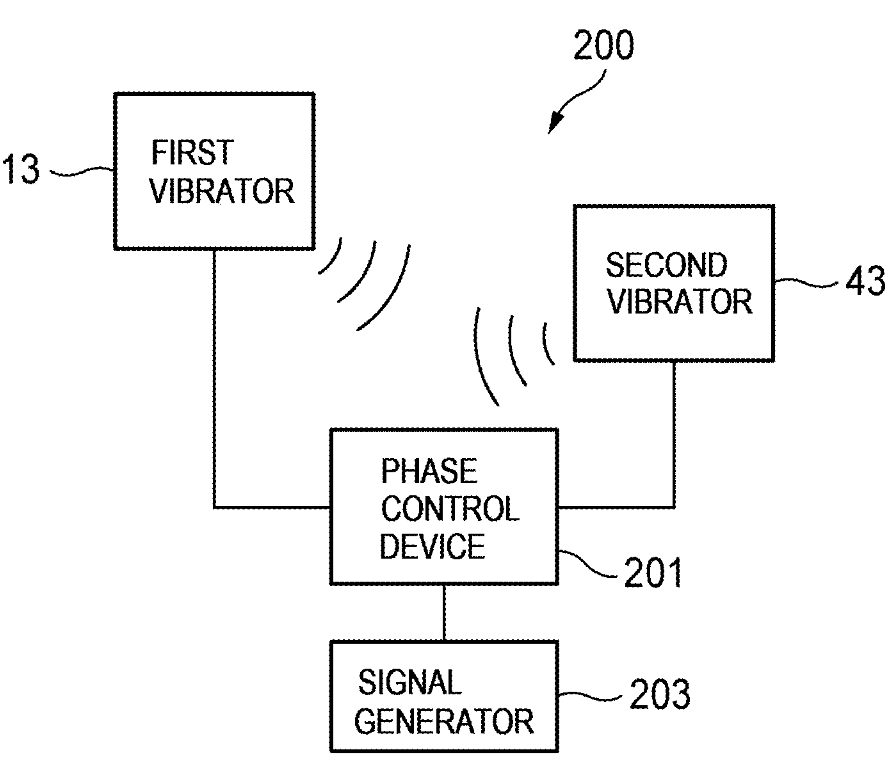
FIG. 5 is a schematic block diagram of a vibrator-attached vehicular window glass system.

FIG. 5 is a schematic block diagram of a vibrator-attached vehicular window glass system 200.

As shown in FIG. 5, the vibrator-attached vehicular window glass system 200 is a system including the vibrator-attached vehicular window glass 100, and includes the first vibrator 13 and a second vibrator 43. The vibrator-attached vehicular window glass system 200 includes a phase control device 201 and a signal generator 203. The first vibrator 13 and the second vibrator 43 are branched from the phase control device 201 and connected to each other. The phase control device 201 is, for example, a digital signal processor (DSP), and controls a signal generated by the signal generator 203 and transmits the signal to the first vibrator 13 and the second vibrator 43.

Figure 6:
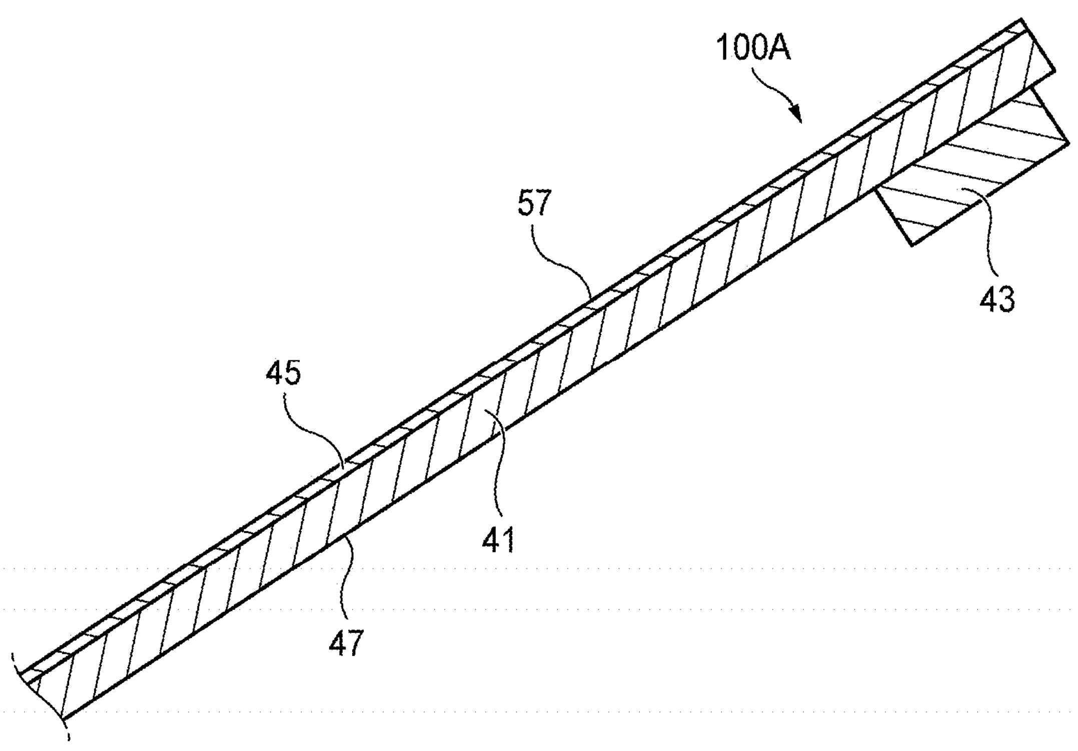
FIG. 6 is a cross-sectional view of a part of a vibrator-attached vehicular window glass including a second vibrator.

FIG. 6 is a cross-sectional view of a part of a vibrator-attached vehicular window glass 100A including the second vibrator 43.

As shown in FIG. 6, the second vibrator 43 is provided on a second glass plate 41 and constitutes the vibrator-attached vehicular window glass 100A. The second glass plate 41 may be a laminated glass in which an intermediate layer is sandwiched between a pair of glass plates, or may be a single plate glass made of one glass plate. Similarly to the first glass plate 11 of the vibrator-attached vehicular window glass 100, when the vibrator-attached vehicular window glass 100A is attached to the vehicle 1, an inclination angle θ of the second glass plate 41 with respect to the horizontal surface Ls is 5° to 175° (see FIG. 3). The second glass plate 41 has a water repellent coating 57 on a first main surface 45, and the first main surface 45 has an improved water sliding property by the water repellent coating 57.

The water repellent coating 57 is the same as the water repellent coating 27 provided on the first glass plate 11, and thus a detailed description thereof is omitted. The inclination angle θ of the second glass plate 41 with respect to the horizontal surface Ls may be 5° to 90°, 30° to 90°, 60° to 90°, or 90° to 175°.

The number of second vibrators 43 attached to the second glass plate 41 may be basically one, but may be two or more. That is, in the present specification, the second vibrator 43 implies that it includes not only a single one but also multiple ones. Hereinafter, the number of second vibrators 43 attached to the second glass plate 41 will be described as one unless otherwise specified.

The second vibrator 43 is attached to a second main surface 47 opposite to the first main surface 45 of the second glass plate 41, and applies a vibration to the second glass plate 41. The second vibrator 43 is a vibrator that vibrates at an excitation frequency of 10 Hz to 100,000 Hz, and a known exciter can be used. An excitation frequency of the second vibrator 43 is preferably 20 Hz to 20,000 Hz, more preferably 20 Hz to 10,000 Hz, still more preferably 10 Hz to 1,000 Hz, even more preferably 20 Hz to 1,000 Hz, yet more preferably 30 Hz to 1,000 Hz, further more preferably 30 Hz to 200 Hz, and particularly preferably 30 Hz to 100 Hz. The second vibrator 43 may be fixed to the second main surface 47 of the second glass plate 41 via an adhesive, a sticking agent, or the like, or may be fixed by fastening to, using a bolt, a screw, or the like, a mounting member fixed to the second main surface 47 of the second glass plate 41. The second vibrator 43 may be coupled to the second main surface 47 of the second glass plate 41 via a transmission member that transmits the vibration, and the vibration of the second vibrator 43 may be applied to the second glass plate 41 via the transmission member. Further, the second vibrator 43 may be attached to the first main surface 45 as long as the second vibrator 43 has a waterproof function.

Examples of the first glass plate 11 of the vibrator-attached vehicular window glass 100 and the second glass plate 41 of the vibrator-attached vehicular window glass 100A include a combination selected from glasses of the rear window RW, the windshield WS, the roof glazing RG, the front side windows FSW, the rear side windows RSW, and the like of the vehicle 1 (see FIG. 1). In this example, the vibrator-attached vehicular window glass 100 is attached as the rear window RW of the vehicle 1, and the vibrator-attached vehicular window glass 100A is attached as at least one of the windshield WS, the roof glazing RG, the front side windows FSW, and the rear side windows RSW of the vehicle 1.

In the vibrator-attached vehicular window glass system 200, the signal generated by the signal generator 202 is controlled by the phase control device 201 and transmitted to the first vibrator 13 and the second vibrator 43. Accordingly, each of the first vibrator 13 and the second vibrator 43 vibrates.

In the vibrator-attached vehicular window glass 100, the first vibrator 13 vibrates at the excitation frequency of 10 Hz to 100,000 Hz. Accordingly, the vibration is applied from the first vibrator 13 to the first glass plate 11 of the vibrator-attached vehicular window glass 100, and the water droplets on the first main surface 15 having the water repellent coating 27 easily fall.

At this time, the first vibrator 13 is controlled by the phase control device 201 such that a phase of a sound of the first vibrator 13 is inverted from a phase of a sound of the second vibrator 43. Accordingly, a sound pressure generated from the first glass plate 11 to which the first vibrator 13 is attached is canceled by a sound pressure generated from the second glass plate 41 to which the second vibrator 43 is attached, and a sound generated from the first glass plate 11 is prevented. A sound pressure of the first vibrator 13 and a sound pressure of the second vibrator 43 may be controlled to be substantially the same as each other by the phase control device 201. Accordingly, the sound pressure generated from the first glass plate 11 to which the first vibrator 13 is attached is more efficiently canceled by the sound pressure generated from the second glass plate 41 to which the second vibrator 43 is attached. The sound pressure of the first vibrator 13 and the sound pressure of the second vibrator 43 being substantially the same as each other mean that sound pressures emitted from diaphragms (first glass plate 11, and second glass plate 41) provided with each vibrator are equal to each other.

As described above, according to the vibrator-attached vehicular window glass system 200, it is possible to prevent the sound generated from the first glass plate 11 while increasing the water falling efficiency of the first glass plate 11 of the vibrator-attached vehicular window glass 100 coated with the water repellent coating 27, and to secure quietness in a vehicle interior.

As the excitation frequency of each of the first vibrator 13 and the second vibrator 43 increases, a wavelength in the air at the frequency becomes shorter. Therefore, as the frequency from the first vibrator 13 and the second vibrator 43 attached to the vehicle decreases, that is, as the wavelength in the air increases, the quietness can be easily secured regardless of a position in the vehicle interior. For example, cancellation levels of sound pressures at two locations, that is, a position near the ears of an occupant in a driver seat and a position near the ears of an occupant in a rear seat, are likely to be the same as each other. For example, a sound wave at 1,000 Hz in the air has a distance of about 340 mm. Therefore, the excitation frequency may be in the above frequency range (10 Hz to 100,000 Hz), and for example, when the excitation frequency is 10 Hz to 1,000 Hz, the quietness is easily controlled regardless of the position in the vehicle interior.

In addition, one phase control device 201 is branched into and connects each of the first vibrator 13 and the second vibrator 43, and thus the system can be simplified.

Moreover, in the vibrator-attached vehicular window glass system 200, the second vibrator 43 applies the vibration to the second glass plate 41 at the excitation frequency of 10 Hz to 100,000 Hz also in the vibrator-attached vehicular window glass 100A. Accordingly, water falling efficiency of the first main surface 45 having the water repellent coating 57 of the second glass plate 41 is increased. Therefore, while ensuring the quietness, it is possible to ensure a good field of view during traveling in a rainy weather or the like both on the first glass plate 11 and on the second glass plate 41. An example of a combination of the first glass plate 11 and the second glass plate 41 may be shown as the rear window RW and the windshield WS, but the present invention is not limited to this combination and any combination can be adopted. For example, the combination may be the rear window RW and the rear side window RSW.

When the vibrator-attached vehicular window glass 100A is attached to the vehicle 1, the inclination angle θ of the second glass plate 41 with respect to the horizontal surface Ls is 5° to 175°, and thus the water falling effect can also be obtained by gravity with respect to water droplets adhering to the first main surface 45 of the second glass plate 41.

In the vibrator-attached vehicular window glass system 200, the vibrator-attached vehicular window glass 100A may have a speaker function that enhances an acoustic effect inside the vehicle by applying a vibration to the second glass plate 41 by the second vibrator 43 to generate a sound.

Figure 7:
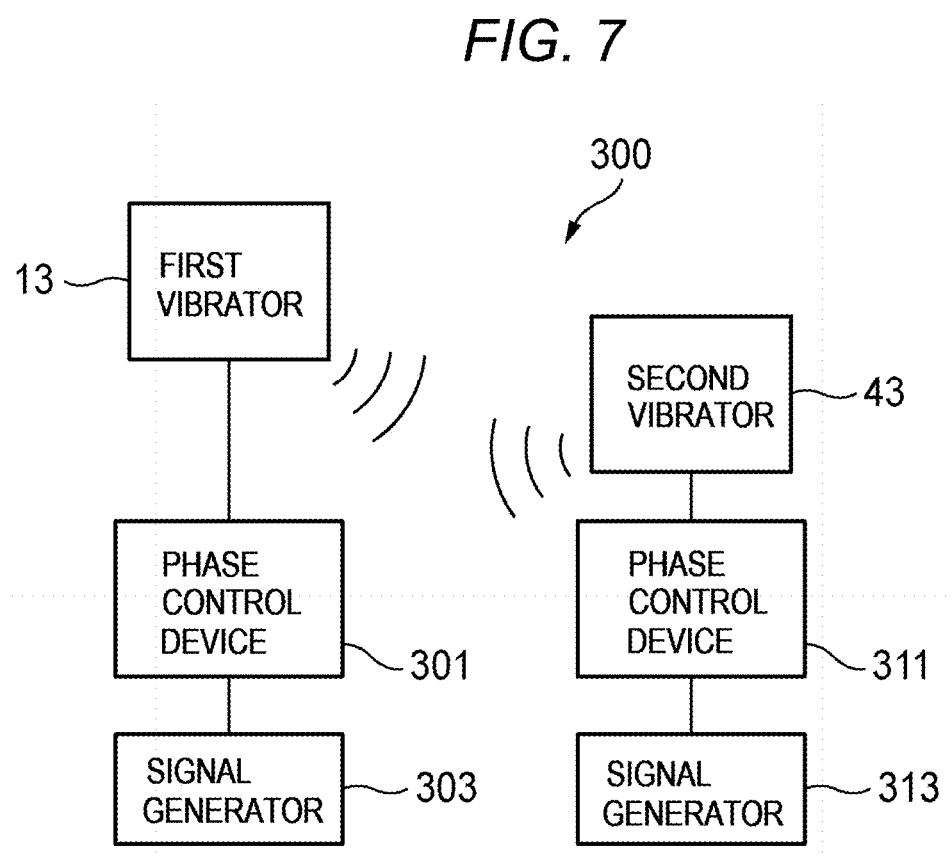

FIG. 7 is a schematic block diagram showing a modification of the vibrator-attached vehicular window glass system. As shown in FIG. 7, a vibrator-attached vehicular window glass system 300 may be a system in which the first vibrator 13 and the second vibrator 43 include phase control devices 301 and 311 and signal generators 303 and 313, respectively. In the vibrator-attached vehicular window glass system 300, signals generated by the signal generators 303 and 313 are controlled by the phase control devices 301 and 311 and transmitted to the first vibrator 13 and the second vibrator 43, respectively. Accordingly, a phase of a sound of the first vibrator 13 is inverted from a phase of a sound of the second vibrator 43, and a sound pressure generated from the first glass plate 11 to which the first vibrator 13 is attached is canceled by a sound pressure generated from the second glass plate 41 to which the second vibrator 43 is attached, and a sound generated from the first glass plate 11 is prevented.

Next, a vibrator-attached vehicular window glass system 400 having another configuration will be described.

Figure 8:
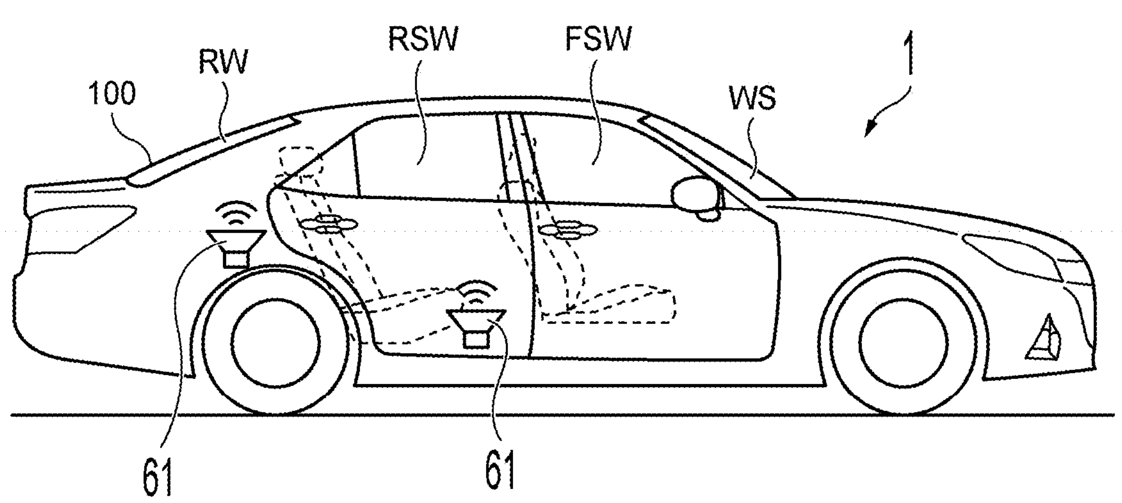
FIG. 8 is a side view of the vehicle including the vibrator-attached vehicular window glass.
Figure 9:
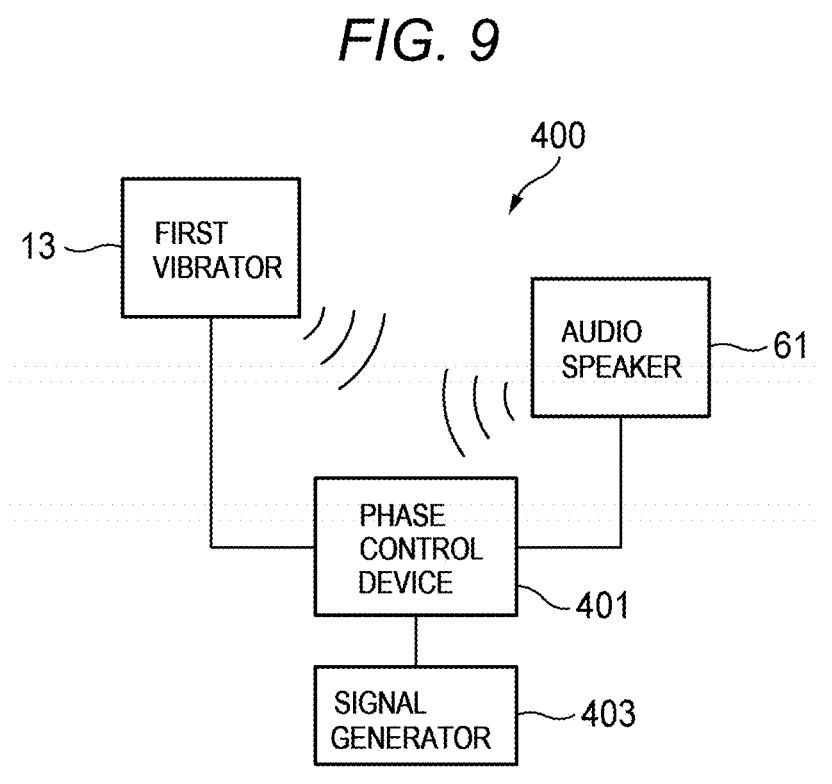

FIG. 8 is a side view of the vehicle 1 including the vibrator-attached vehicular window glass 100. FIG. 9 is a schematic block diagram of the vibrator-attached vehicular window glass system 400 that includes audio speakers 61 as the second vibrator.

As shown in FIGS. 8 and 9, the vehicle 1 is provided with the audio speakers 61 at a rear portion in the interior and inside a rear side door, and the vibrator-attached vehicular window glass system 400 is implemented by the audio speakers 61 as the second vibrator. The phase control device 401 is branched into and connects each of the first vibrator 13 of the vibrator-attached vehicular window glass 100 and the audio speakers 61.

In the vibrator-attached vehicular window glass system 400, a signal generated by the signal generator 403 is controlled by the phase control device 401 and transmitted to the first vibrator 13 and the audio speakers 61.

In the vibrator-attached vehicular window glass 100, the first vibrator 13 vibrates at an excitation frequency of 10 Hz to 100,000 Hz, a vibration is applied from the first vibrator 13 to the first glass plate 11 of the vibrator-attached vehicular window glass 100, and water droplets on the first main surface 15 having the water repellent coating 27 easily fall.

At this time, the first vibrator 13 is controlled by the phase control device 201 such that a phase of a sound of the first vibrator 13 is inverted from a phase of a sound of the audio speakers 61. Accordingly, a sound pressure generated from the first glass plate 11 to which the first vibrator 13 is attached is canceled by a sound pressure generated from the audio speakers 61, and a sound generated from the first glass plate 11 is prevented.

As described above, also in a case of the vibrator-attached vehicular window glass system 400, it is possible to prevent the sound generated from the first glass plate 11 while increasing water falling efficiency of the first glass plate 11 of the vibrator-attached vehicular window glass 100 coated with the water repellent coating 27, and to secure quietness in a vehicle interior. In addition, a dedicated vibrator for canceling a sound pressure of the first vibrator 13 can be eliminated, and the system can be simplified.

In the vibrator-attached vehicular window glass system, the first vibrator 13 and the audio speakers 61 may each include a phase control device and a signal generator, and signals generated by the signal generators may be controlled by the phase control devices and transmitted to the first vibrator 13 and the audio speakers 61, respectively (see FIG. 7).

EXAMPLES

Measurement of Water Sliding Property

A water sliding property of a glass to be measured which has a main surface with a water repellent coating was measured.

Measurement Method

Figure 10:
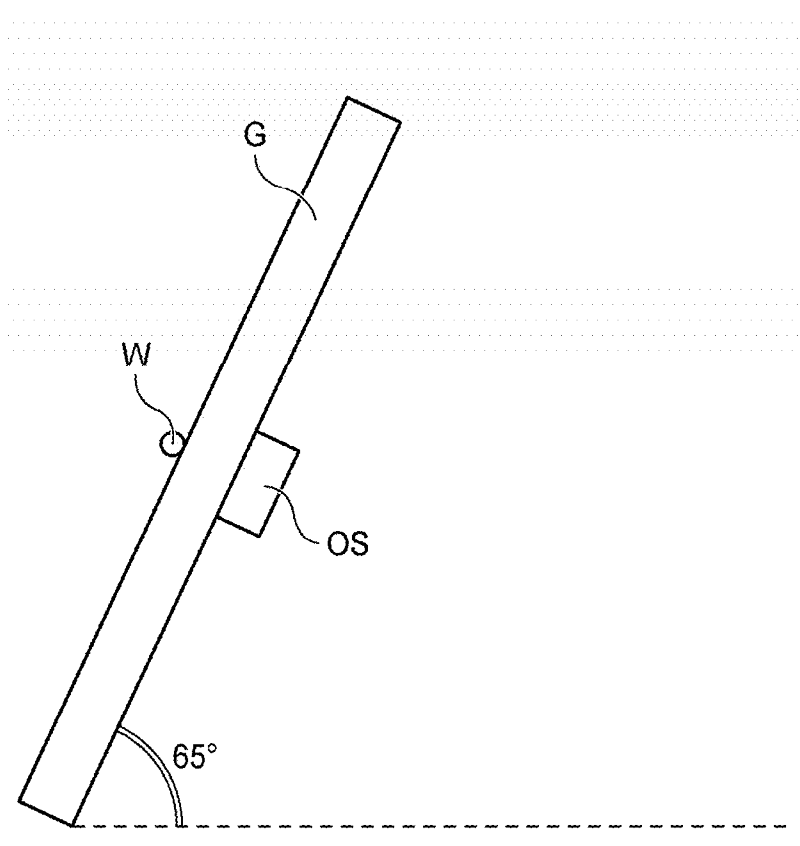
FIG. 10 is a schematic side view of a glass to be measured, illustrating a method for measuring a water sliding property of a glass plate.
Figure 11:
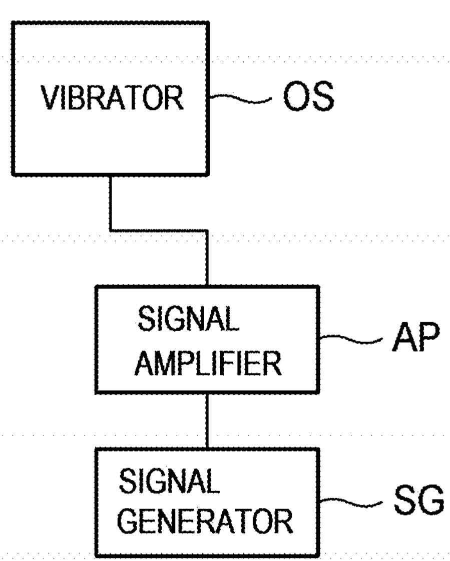
FIG. 11 is a schematic block diagram of a device for measuring the water sliding property of the glass plate.

FIG. 10 is a schematic side view of a glass G to be measured, illustrating a method for measuring a water sliding property of a glass plate. FIG. 11 is a schematic block diagram of a device for measuring the water sliding property of the glass plate.

As the glass G to be measured, a glass was used which was obtained by applying a water repellent coating to one main surface (first main surface) of a laminated glass G in which an intermediate layer was provided between two glass plates. Then, a vibrator OS to which a signal generator SG was connected via a signal amplifier AP was attached to a center position of the other main surface (second main surface) of the glass G to be measured via a sticking agent. At this time, the glass G to be measured was inclined at an inclination angle of 65° with respect to a horizontal surface, and the vibrator OS was vibrated by a signal from the signal generator SG amplified by the signal amplifier AP. Further, a water droplet W was dropped on the one main surface of the glass G to be measured, and a size of the falling water droplet W (water droplet volume) was measured when an input signal level to the vibrator OS was set to 1.0 Vpp and 2.0 Vpp.

The above water sliding property measurement was performed for Test Examples 1 to 4 in which a frequency of an input signal to the vibrator OS was varied. In addition, in Test Example 5, the water sliding property measurement was performed when no signal was input to the vibrator OS.

Glass to be Measured (1) Glass Plate

Size: 300 mm×300 mm

Thickness of each glass plate: 2.0 mm (thickness of two glass plates: 4.0 mm)

(2) Intermediate Layer

Material: polyvinyl butyral (PVB)

Thickness: 30 mil (0.8 mm)

(3) Water Repellent Coating

Water repellent film described in JP2014-74118A

Frequency of Input Signal

Test Example 1: 50 Hz

Test Example 2: 100 Hz

Test Example 3: 1,000 Hz

Test Example 4: 20,000 Hz

Test Example 5: 0 Hz (no signal)

(Measurement Results)

Measurement results of the water sliding property are shown in Table 1.

TABLE 1

| | 1.0 Vpp | 2.0 Vpp |
|---|---|---|
| Test Example 1 (50 Hz) | 6 μL | 2 μL |
| Test Example 2 (100 Hz) | 9 μL | 7 μL |
| Test Example 3 (1,000 Hz) | 9 μL | 9 μL |
| Test Example 4 (20,000 Hz) | 9 μL | 9 μL |
| Test Example 5 (no signal) | 9 μL | |

As shown in Table 1, in Test Example 1 in which the frequency of the input signal was 50 Hz, the water droplet volume was 6 μL when the input signal level was 1.0 Vpp, and the water droplet volume was 2 μL when the input signal level was 2.0 Vpp.

In Test Example 2 in which the frequency of an input signal was 100 Hz, the water droplet volume was 9 μL when the input signal level was 1.0 Vpp, and the water droplet volume was 7 μL when the input signal level was 2.0 Vpp.

In each of Test Example 3 in which the frequency of the input signal was 1,000 Hz and Test Example 4 in which the frequency of the input signal was 20,000 Hz, the water droplet volume was 9 μL in both cases of the input signal level of 1.0 Vpp and the input signal level of 2.0 Vpp. Although Test Example 3 and Test Example 4 showed results up to 2.0 Vpp, it was predicted that by providing a signal level exceeding 2.0 Vpp (for example, 3.0 Vpp and 4.0 Vpp), the water droplet volume became smaller than 9 μL.

In Test Example 5 in which no signal was input to the vibrator OS, the water droplet volume was 9 μL.

From the above measurement results, it was found that, by applying the vibration to the glass plate by the vibrator OS, the water sliding property of the main surface of the glass plate having the water repellent coating was improved, and a smaller water droplet fell effectively. In addition, it is considered that even when the frequency of the input signal is high (1,000 Hz and 20,000 Hz), the improvement of the water sliding property can be expected by further increasing the input signal level.

As described above, the present invention is not limited to the embodiment described above, and combinations of the configurations in the embodiment with each other, modifications and applications by those skilled in the art based on the description of the specification and known techniques are also contemplated by the present invention and are included in the scope of protection.

As described above, the following matters are disclosed in the present specification.

(1) A vibrator-attached vehicular window glass, including:

a vehicular window glass including a first glass plate having a first main surface with a water repellent coating; and a first vibrator configured to apply a vibration to the first glass plate, in which the first vibrator is configured to vibrate at an excitation frequency of 10 Hz to 100,000 Hz.

According to the vibrator-attached vehicular window glass, the vibration is applied to the first glass plate at the excitation frequency of 10 Hz to 100,000 Hz, and thus water falling efficiency of the first main surface of the first glass plate having the water repellent coating can be increased. Accordingly, it is possible to ensure a good field of view during traveling in a rainy weather or the like.

(2) The vibrator-attached vehicular window glass according to (1), in which the first vibrator is attached to a second main surface opposite to the first main surface.

According to the vibrator-attached vehicular window glass, by the vibration applied from the first vibrator attached to the second main surface of the first glass plate, water droplets adhering to the first main surface of the first glass plate having the water repellent coating fall efficiently.

(3) The vibrator-attached vehicular window glass according to (2), in which when the vehicular window glass is attached to a vehicle, the first vibrator is attached in a vicinity of an upper side of the first glass plate.

According to the vibrator-attached vehicular window glass, by the vibration applied from the first vibrator attached in the vicinity of the upper side of the first glass plate, the water droplets adhering to the first main surface of the first glass plate fall efficiently.

(4) The vibrator-attached vehicular window glass according to (3), in which the first vibrator is attached in a vicinity of a center portion of the upper side of the first glass plate.

According to the vibrator-attached vehicular window glass, by the vibration applied from the first vibrator attached in the vicinity of the center portion of the upper side of the first glass plate, the water droplets adhering to the first main surface of the first glass plate fall efficiently and in a well-balanced manner over the entire width direction.

(5) The vibrator-attached vehicular window glass according to any one of (1) to (4), in which when the vehicular window glass is attached to a vehicle, an inclination angle of the first glass plate with respect to a horizontal surface is 5° to 175°.

According to the vibrator-attached vehicular window glass, the water droplets repelled by the water repellent coating fall efficiently by the vibration applied from the first vibrator and gravity.

(6) A vibrator-attached vehicular window glass system, including:

the vibrator-attached vehicular window glass according to any one of (1) to (5); and a second vibrator different from the first vibrator, in which a sound pressure generated from a diaphragm provided with the second vibrator is controlled to cancel a sound pressure generated from the first glass plate provided with the first vibrator.

According to the vibrator-attached vehicular window glass system, the sound pressure generated from the first glass plate provided with the first vibrator is canceled by the sound pressure generated from the diaphragm provided with the second vibrator, and good quietness in an interior can be achieved. Accordingly, a comfortable vehicle interior space is obtained while ensuring a good field of view.

(7) The vibrator-attached vehicular window glass system according to (6), in which the first vibrator and the second vibrator are connected to a phase control device, and controlled by the phase control device such that a phase of a sound of the first vibrator is inverted from a phase of a sound of the second vibrator.

According to the vibrator-attached vehicular window glass system, the phase of the sound of the first vibrator is inverted from the phase of the sound of the second vibrator by the phase control device to which the first vibrator and the second vibrator are connected, and thus the sound pressure generated from the first glass plate provided with the first vibrator can be canceled by the sound pressure generated from the diaphragm provided with the second vibrator.

(8) The vibrator-attached vehicular window glass system according to (7), in which the phase control device is branched into and connects each of the first vibrator and the second vibrator.

According to the vibrator-attached vehicular window glass system, one phase control device is branched into and connects each of the first vibrator and the second vibrator, and thus the system can be simplified.

(9) The vibrator-attached vehicular window glass system according to any one of (6) to (8), in which a sound pressure of the first vibrator and a sound pressure of the second vibrator are substantially the same.

According to the vibrator-attached vehicular window glass system, the sound pressure of the first vibrator and the sound pressure of the second vibrator are substantially the same, and thus the sound pressure generated from the first glass plate provided with the first vibrator can be canceled more efficiently by the sound pressure generated from the diaphragm provided with the second vibrator.

(10) The vibrator-attached vehicular window glass system according to any one of (6) to (9), in which the second vibrator includes an audio speaker.

According to the vibrator-attached vehicular window glass system, a dedicated vibrator for canceling the sound pressure of the first glass plate provided with the first vibrator can be eliminated, and the system can be simplified.

(11) The vibrator-attached vehicular window glass system according to any one of (6) to (10), in which the vehicular window glass includes a second glass plate having a first main surface with a water repellent coating, and the second vibrator is configured to apply a vibration to the second glass plate at an excitation frequency of 10 Hz to 100,000 Hz.

According to the vibrator-attached vehicular window glass system, the vibration is applied to the second glass plate at the excitation frequency of 10 Hz to 100,000 Hz, and thus water falling efficiency of the first main surface of the second glass plate having the water repellent coating can be increased. Accordingly, while ensuring the quietness, it is possible to ensure a good field of view during traveling in a rainy weather or the like both on the first glass plate and on the second glass plate.

(12) The vibrator-attached vehicular window glass system according to (11), in which the second vibrator is attached to a second main surface opposite to the first main surface.

According to the vibrator-attached vehicular window glass system, by the vibration applied from the second vibrator attached to the second main surface of the second glass plate, water droplets adhering to the first main surface of the second glass plate having the water repellent coating fall efficiently.

(13) The vibrator-attached vehicular window glass system according to (11) or (12), in which when the vehicular window glass is attached to a vehicle, an inclination angle of the second glass plate with respect to a horizontal surface is 5° to 175°.

According to the vibrator-attached vehicular window glass system, the water droplets repelled by the water repellent coating fall efficiently by the vibration applied from the second vibrator and gravity.

(14) The vibrator-attached vehicular window glass system according to any one of (11) to (13), in which the first glass plate and the second glass plate are a combination selected from a rear window, a windshield, a roof glazing, and a side window.

According to the vibrator-attached vehicular window glass system, by the first glass plate and the second glass plate which are a combination selected from the rear window, the windshield, the roof glazing, and the side window, it is possible to ensure a good field of view during traveling in a rainy weather or the like while ensuring the quietness.

Although various embodiments have been described above with reference to the drawings, it is needless to say that the present invention is not limited to such examples. It is obvious for a person skilled in the art that various modifications and variations can be made within the category described in the scope of claims and it is understood that such modifications and variations naturally belong to the technical scope of the present invention. Further, the components described in the above embodiment may be combined in any manner without departing from the gist of the invention.

Note that the present application is based on Japanese Patent Application No. 2021-185838 filed on Nov. 15, 2021, contents of which are incorporated herein by reference.

REFERENCE SIGNS LIST

1: vehicle
11: first glass plate
11*a*: upper side
13: first vibrator
15: first main surface
17: second main surface
27: water repellent coating
41: second glass plate
43: second vibrator
45: first main surface
47: second main surface
57: water repellent coating
61: audio speaker (second vibrator)
100 and 100A: vibrator-attached vehicular window glass
200, 300 and 400: vibrator-attached vehicular window glass system
201, 301, 311 and 401: phase control device
203, 303, 313 and 403: signal generator
θ: inclination angle
Ls: horizontal surface
RW: rear window
WS: windshield
RG: roof glazing
FSW: front side window (side window)
RSW: rear side window (side window)

What is claimed is:

1. A vibrator-attached vehicular window glass, comprising:

a vehicular window glass comprising a first glass plate comprising a first main surface with a water repellent coating; and a first vibrator configured to apply a vibration to the first glass plate, wherein the first vibrator is configured to vibrate at an excitation frequency of 50 Hz to 20,000 Hz.

2. The vibrator-attached vehicular window glass according to claim 1, wherein the first vibrator is attached to a second main surface opposite to the first main surface of the first glass plate.

3. The vibrator-attached vehicular window glass according to claim 1, wherein when the vehicular window glass is attached to a vehicle, the first vibrator is attached in a vicinity of an upper side of the first glass plate.

4. The vibrator-attached vehicular window glass according to claim 3, wherein the first vibrator is attached in a vicinity of a center portion of the upper side of the first glass plate.

5. The vibrator-attached vehicular window glass according to claim 1, wherein when the vehicular window glass is attached to a vehicle, an inclination angle of the first glass plate with respect to a horizontal surface is 5° to 175°.

6. A vibrator-attached vehicular window glass system, comprising:

the vibrator-attached vehicular window glass according to claim 1; and a second vibrator different from the first vibrator, wherein a sound pressure generated from a diaphragm provided with the second vibrator is controlled to cancel a sound pressure generated from the first glass plate provided with the first vibrator.

7. The vibrator-attached vehicular window glass system according to claim 6, wherein the first vibrator and the second vibrator are connected to a phase control device, and controlled by the phase control device such that a phase of a sound of the first vibrator is inverted from a phase of a sound of the second vibrator.

8. The vibrator-attached vehicular window glass system according to claim 7, wherein the first vibrator and the second vibrator are branched from the phase control device and connected to each other.

9. The vibrator-attached vehicular window glass system according to claim 6, wherein a sound pressure of the first vibrator and a sound pressure of the second vibrator are substantially the same.

10. The vibrator-attached vehicular window glass system according to claim 6, wherein the second vibrator comprises an audio speaker.

11. The vibrator-attached vehicular window glass system according to claim 6, wherein the vehicular window glass comprises a second glass plate comprising a first main surface with a water repellent coating, and the second vibrator is configured to apply a vibration to the second glass plate at an excitation frequency of 10 Hz to 100,000 Hz.

12. The vibrator-attached vehicular window glass system according to claim 11, wherein the second vibrator is attached to a second main surface opposite to the first main surface of the second glass plate.

13. The vibrator-attached vehicular window glass system according to claim 11, wherein when the vehicular window glass is attached to a vehicle, an inclination angle of the second glass plate with respect to a horizontal surface is 5° to 175°.

14. The vibrator-attached vehicular window glass system according to claim 11, wherein the first glass plate and the second glass plate are a combination selected from a rear window, a windshield, a roof glazing, and a side window.

15. The vibrator-attached vehicular window glass according to claim 1, wherein the excitation frequency is 50 Hz to 1,000 Hz.

16. The vibrator-attached vehicular window glass according to claim 1, wherein the excitation frequency is 50 Hz to 200 Hz.

17. The vibrator-attached vehicular window glass according to claim 1, wherein the excitation frequency is 50 Hz to 100 Hz.

18. The vibrator-attached vehicular window glass according to claim 1, wherein the vehicular window glass is a front side window that slides up and down and the first vibrator is disposed so as to have an intensity distribution that excites a region in front of the vehicular window glass more strongly when the vehicular window glass is attached to a vehicle.

* * * * *